(12) United States Patent
Saborido Rodriguez et al.

(10) Patent No.: US 12,311,789 B2
(45) Date of Patent: May 27, 2025

(54) METHOD AND SYSTEM FOR CONTROLLING ON-BOARD BATTERY CHARGER OF ELECTRIC VEHICLE TO ACCOMMODATE TRANSIENTS IN SUPPLY VOLTAGE

(71) Applicant: Lear Corporation, Southfield, MI (US)

(72) Inventors: Victor Saborido Rodriguez, Valls (ES); Cesar Ruano Alvarez, Valls (ES); Adria Marcos Pastor, Valls (ES); Sergio Martinez Porras, Valls (ES)

(73) Assignee: Lear Corporation, Southfield, MI (US)

( * ) Notice: Subject to any disclaimer, the term of this patent is extended or adjusted under 35 U.S.C. 154(b) by 916 days.

(21) Appl. No.: 17/467,486

(22) Filed: Sep. 7, 2021

(65) Prior Publication Data

US 2022/0176838 A1    Jun. 9, 2022

Related U.S. Application Data

(60) Provisional application No. 63/123,064, filed on Dec. 9, 2020.

(51) Int. Cl.
*B60L 53/20* (2019.01)
*H02J 7/00* (2006.01)
(Continued)

(52) U.S. Cl.
CPC .......... *B60L 53/20* (2019.02); *H02J 7/00304* (2020.01); *B60L 2210/10* (2013.01);
(Continued)

(58) Field of Classification Search
CPC ............................ H02J 7/00304; B60L 53/20
(Continued)

(56) References Cited

U.S. PATENT DOCUMENTS 3,950,691 A * 4/1976 Ohba ................. H02M 7/53806
361/91.6
5,465,011 A   11/1995 Miller et al.
(Continued)

FOREIGN PATENT DOCUMENTS

CN    103475072 A    12/2013
CN    106169779 A    11/2016
(Continued)

OTHER PUBLICATIONS

Chinese Patent and Trademark Office, 1st Office Action for Chinese Patent Application No. 202111460095.1 dated Aug. 9, 2023.

*Primary Examiner* — John T Trischler
(74) *Attorney, Agent, or Firm* — Brooks Kushman P.C.

(57) ABSTRACT

An on-board battery charger (OBC) of an electric vehicle (EV) receives AC electrical power from a charge station and outputs a DC output current for charging a traction battery of the EV. In response to transients in the AC electrical power while the OBC is receiving the AC electrical power from the charge station and outputting the DC output current, a controller controls the OBC to (i) stop processing the AC electrical power from the charge station and reduce the DC output current and (ii) after the transients have passed, resume processing the AC electrical power from the charge station and increase the DC output current. At a zero-crossing event of the AC electrical power after the transients have passed, the OBC is controlled to resume processing the AC electrical power from the charge station and increase the DC output current.

20 Claims, 7 Drawing Sheets

(51) Int. Cl.
*H02J 7/34* (2006.01)
*H02M 1/42* (2007.01)

(52) U.S. Cl.
CPC ............ *B60L 2210/30* (2013.01); *H02J 7/34* (2013.01); *H02M 1/4208* (2013.01); *H02M 1/4216* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 5,581,171 | A * | 12/1996 | Kerfoot | B60L 53/20 320/137 |
| 5,631,550 | A * | 5/1997 | Castro | H02M 1/4216 323/283 |
| 7,247,998 | B2 * | 7/2007 | Poehlman | H05B 41/2855 315/291 |
| 7,782,009 | B2 * | 8/2010 | Wiseman | H02M 5/4505 318/803 |
| 7,855,466 | B2 * | 12/2010 | Bax | H02J 7/02 290/40 C |
| 7,880,331 | B2 * | 2/2011 | Bax | B60L 58/10 307/46 |
| 7,994,758 | B2 * | 8/2011 | Popescu | H02M 1/4225 363/21.03 |
| 8,373,394 | B1 * | 2/2013 | Huta | G05F 1/70 323/299 |
| 8,638,063 | B2 | 1/2014 | Paryani et al. | |
| 8,810,062 | B2 * | 8/2014 | Murray | H02J 7/34 307/9.1 |
| 9,118,206 | B2 * | 8/2015 | Peterson | H02J 7/34 |
| 9,333,864 | B2 * | 5/2016 | Acena | B60L 53/20 |
| 9,884,560 | B2 * | 2/2018 | Jang | B60L 53/53 |
| 9,979,227 | B2 * | 5/2018 | Li | H02J 7/0068 |
| 10,090,776 | B2 * | 10/2018 | Basic | H02M 7/5387 |
| 10,116,234 | B2 * | 10/2018 | Raboni | H02M 7/5387 |
| 10,177,554 | B2 * | 1/2019 | Wu | H02H 3/08 |
| 10,804,793 | B2 * | 10/2020 | Masich | B60L 53/22 |
| 10,819,220 | B2 * | 10/2020 | Liu | H02M 1/32 |
| 11,010,503 | B2 * | 5/2021 | Ramanujam | G06F 30/20 |
| 11,228,246 | B1 * | 1/2022 | Vinciarelli | H02M 3/33523 |
| 11,368,102 | B2 * | 6/2022 | Tsuboka | H02M 3/155 |
| 11,407,326 | B2 * | 8/2022 | Gaertner | G06Q 10/025 |
| 11,486,360 | B2 * | 11/2022 | Wagoner | H02J 3/00125 |
| 11,496,043 | B2 * | 11/2022 | Ren | H02M 1/4233 |
| 11,736,014 | B1 * | 8/2023 | Vinciarelli | H02M 3/33569 307/31 |
| 11,824,433 | B2 * | 11/2023 | Neudorf | H02M 1/0058 |
| 2003/0095421 | A1 * | 5/2003 | Kadatskyy | H02M 1/34 363/65 |
| 2004/0257005 | A1 * | 12/2004 | Poehlman | H05B 41/2855 315/307 |
| 2008/0007886 | A1 * | 1/2008 | Wiseman | H02P 27/06 363/54 |
| 2008/0157592 | A1 * | 7/2008 | Bax | B60L 58/10 320/135 |
| 2008/0157593 | A1 * | 7/2008 | Bax | B60L 50/61 307/19 |
| 2010/0052641 | A1 * | 3/2010 | Popescu | H02M 1/4225 323/300 |
| 2011/0145141 | A1 * | 6/2011 | Blain | B60L 53/65 235/382 |
| 2011/0215641 | A1 * | 9/2011 | Peterson | H02J 4/00 307/23 |
| 2013/0057210 | A1 | 3/2013 | Nergaard et al. | |
| 2013/0214596 | A9 * | 8/2013 | Peterson | H02J 7/14 307/23 |
| 2013/0257148 | A1 * | 10/2013 | Murray | H02J 7/1415 29/622 |
| 2013/0320922 | A1 | 12/2013 | Acena et al. | |
| 2015/0061569 | A1 * | 3/2015 | Alexander | B60L 53/63 320/109 |
| 2015/0069970 | A1 | 3/2015 | Sarkar et al. | |
| 2016/0285267 | A1 * | 9/2016 | Stone | G06F 1/3203 |
| 2016/0339787 | A1 | 11/2016 | Jang et al. | |
| 2017/0005511 | A1 * | 1/2017 | Li | H02J 7/0068 |
| 2017/0187303 | A1 * | 6/2017 | Raboni | H02M 1/32 |
| 2017/0214335 | A1 * | 7/2017 | Basic | H02M 7/48 |
| 2017/0244236 | A1 * | 8/2017 | Wu | G06F 1/305 |
| 2018/0219474 | A1 | 8/2018 | Greetham et al. | |
| 2018/0257495 | A1 | 9/2018 | Miller | |
| 2019/0241089 | A1 | 8/2019 | Heyne et al. | |
| 2019/0353690 | A1 * | 11/2019 | Ramanujam | B60L 53/68 |
| 2020/0195131 | A1 | 6/2020 | Masich et al. | |
| 2020/0269717 | A1 * | 8/2020 | Gaertner | B60L 53/68 |
| 2020/0304015 | A1 * | 9/2020 | Liu | H02M 3/01 |
| 2020/0366104 | A1 | 11/2020 | Stanfield | |
| 2021/0028691 | A1 | 1/2021 | Martinez et al. | |
| 2021/0101500 | A1 | 4/2021 | Brombach et al. | |
| 2021/0135592 | A1 * | 5/2021 | Tsuboka | H02M 1/32 |
| 2021/0296981 | A1 * | 9/2021 | Neudorf | H02M 1/0048 |
| 2021/0320601 | A1 * | 10/2021 | Wagoner | F03D 9/255 |
| 2021/0344270 | A1 * | 11/2021 | Ren | H02M 1/346 |
| 2022/0360117 | A1 * | 11/2022 | Stingu | H02M 7/219 |
| 2023/0238805 | A1 * | 7/2023 | Marcos Pastor | B60L 53/20 320/109 |

FOREIGN PATENT DOCUMENTS

| | | |
|---|---|---|
| CN | 107599857 A | 1/2018 |
| CN | 107852089 A | 3/2018 |
| CN | 111332143 A | 6/2020 |
| JP | 2019092310 A | 6/2019 |

* cited by examiner

METHOD AND SYSTEM FOR CONTROLLING ON-BOARD BATTERY CHARGER OF ELECTRIC VEHICLE TO ACCOMMODATE TRANSIENTS IN SUPPLY VOLTAGE

CROSS-REFERENCE TO RELATED APPLICATIONS

This application claims the benefit of U.S. Provisional Application No. 63/123,064, filed Dec. 9, 2020, the disclosure of which is hereby incorporated in its entirety by reference herein.

TECHNICAL FIELD

The present invention relates to controlling the operation of an on-board battery charger of an electric vehicle concurrently receiving electrical power with other electric vehicles from a common charge station.

BACKGROUND

An on-board battery charger (OBC) of an electric vehicle (EV) uses electrical power from a charge station to charge a traction battery of the EV. In operation, an operator plugs electric vehicle supply equipment (EVSE) of the charge station into the EV to connect the charge station to the EV. The EVSE then supplies electrical power from the charge station to the OBC. The OBC converts the electrical power received from the charge station into a form suitable for charging the traction battery. The OBC outputs the converted electrical power to charge the traction battery.

Herein, the charge station is a multi-EVSE charge station having multiple EVSE. The multiple EVSE may respectively plug into multiple EVs to concurrently connect the charge station to the EVs. The multiple EVSE supply electrical power from the charge station to the OBCs of the EVs. As a result, the OBCs of the EVs concurrently receive and use electrical power from the charge station to charge the fraction batteries of their EVs.

SUMMARY

An object includes a system and a method for controlling an on-board battery charger (OBC) of an electric vehicle (EV) so that the OBC, while receiving electrical power from a charge station for charging a traction battery of the EV, can robustly handle voltage transients in the electrical power supplied from the charge station.

Another object includes a system and a method for controlling an OBC of an EV so that the OBC, while receiving electrical power from a charge station for charging a traction battery of the EV, can robustly handle voltage transients in the electrical power supplied from the charge station caused when another OBC of another EV concurrently starts receiving electrical power from the charge station.

In carrying out at least one of the above object and/or other objects, a system for charging a traction battery of an electric vehicle is provided. The system includes an on-board battery charger and a controller. The OBC is configured to receive AC electrical power from a charge station and to output a DC output current for charging the traction battery. The controller is configured to, in response to transients in the AC electrical power while the OBC is receiving the AC electrical power from the charge station and outputting the DC output current, control the OBC to (i) stop processing the AC electrical power from the charge station and reduce the DC output current and (ii) after the transients have passed, resume processing the AC electrical power from the charge station and increase the DC output current.

In embodiments, the controller is further configured to control the OBC at a zero-crossing event of the AC electrical power after the transients have passed to resume processing the AC electrical power from the charge station and increase the DC output current.

The zero-crossing event of the AC electrical power may be the zero-crossing event of the AC electrical power occurring immediately after the controller has detected that the transients have passed or may be the zero-crossing event of the AC electrical power occurring some time thereafter.

In embodiments, the OBC includes a power factor corrector (PFC) and a DC/DC converter. The PFC is to receive the AC electrical power from the charge station for the OBC to be configured to receive the AC electrical power from the charge station and the DC/DC converter is to output the DC output current for charging the traction battery for the OBC to be configured to output the DC output current to the traction battery.

In at least some of these embodiments, the OBC further includes a DC link capacitor disposed between the PFC and the DC/DC converter and the controller is further configured to control the OBC to have the DC link capacitor discharge to supply DC electrical power for the DC/DC converter to output the reduced DC output current while the OBC is controlled to stop the PFC from processing the AC electrical power from the charge station. The controller may be further configured to control the OBC to have the DC link capacitor be recharged as the OBC is controlled to resume processing the AC electrical power from the charge station.

In embodiments, the AC electrical power includes an AC mains voltage and the transients in the AC electrical power are voltage transients in the AC mains voltage. In at least some of these embodiments, the zero-crossing event of the AC electrical power after the transients have passed is a zero-crossing event of the AC mains voltage after the voltage transients in the AC mains voltage have passed.

In embodiments, the transients in the AC electrical power occur upon another electric vehicle receiving AC electrical power from the charge station while the OBC is receiving the AC electrical power from the charge station.

Also, in carrying out at least one of the above object and/or other objects, a method for charging a traction battery of an electric vehicle is provided. The method includes receiving, by an OBC of the electric vehicle, AC electrical power from a charge station and outputting, by the OBC, a DC output current for charging the traction battery. The method further includes detecting transients in the AC electrical power while the OBC is receiving the AC electrical power from the charge station and outputting the DC output current. The method further includes controlling the OBC, while the transients are present, to stop processing the AC electrical power from the charge station and to reduce the DC output current. The method further includes controlling the OBC, at a zero-crossing event of the AC electrical power after the transients have passed, to resume processing the AC electrical power from the charge station and to increase the DC output current.

Further, in carrying out at least one of the above object and/or other objects, another system for charging a traction battery of an electric vehicle is provided. This system includes an OBC having a power factor corrector (PFC), a DC/DC converter, and a DC link capacitor disposed between the PFC and the DC/DC converter. The PFC is to receive an AC mains voltage from a charge station, the DC link capacitor is to be charged by the PFC to a DC voltage setpoint, and the DC/DC converter is to receive DC electrical power from the DC link capacitor to output a DC output current at a DC current setpoint for charging the traction battery. This system further includes a controller configured to detect voltage transients in the AC mains voltage while the PFC is receiving the AC mains voltage, the DC link capacitor is charged to the DC voltage setpoint, and the DC/DC converter is outputting the DC output current at the DC current setpoint. The controller is further configured to control the OBC, in response to detecting voltage transients in the AC mains voltage, to stop operation of the PFC and reduce the DC output current whereby the DC link capacitor discharges from the DC voltage setpoint and then to resume operation of the PFC at a zero-crossing event of the AC mains voltage after the voltage transients have passed to thereby recharge the DC link capacitor back to the DC voltage setpoint and to increase the DC output current back to the DC current setpoint.

An OBC in accordance with embodiments of the present invention has AC-grid undervoltage resilience. In this regard, the controller of the OBC implements a management algorithm to face AC grid undervoltage transients in a parallel vehicle charging environment when the OBC is charging a traction battery of an EV using electrical power provided by the vehicle charging environment.

The controller generally performs the following operations to implement the management algorithm:
- detecting a deep voltage drop (e.g., voltage transient) caused by the empty capacity of another EV being connected to the same AC-mains source (through multi-EVSE system);
- stopping input stage of the OBC (i.e., stopping the operation of the PFC of the OBC) and reducing output current of the OBC, such as by 50%, while keeping the supply power from the internal DC-link, bulk storage capacitor of the OBC (by stopping the operation of the PFC during the voltage transient, the PFC is prevented to operate under such voltage transient while the OBC remains connected to the AC-mains source);
- after detecting that the voltage drop has disappeared, synchronizing with the next AC-mains zero-crossing event to resume operation of the OBC so that through the PFC the bulk storage capacitor charges to the expected setpoint;
- once the bulk storage capacitor is at the setpoint, resuming charging of the traction battery of the EV with the demanded output current.

By implementing the management algorithm, the controller prevents unexpected and undesired charging stop after a second EV is connected to the same AC mains supply through a multi-EVSE system. In contrast, typical OBCs would go OFF assuming an AC-input failure, which requires manual restart.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
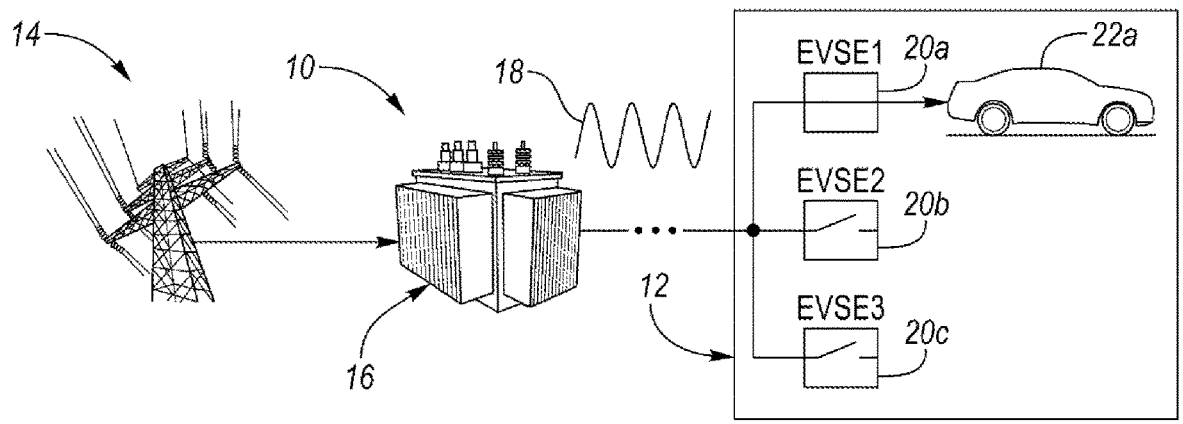
FIG. 1 illustrates a block diagram of an electric power transmission system having a charge station for concurrently charging electric vehicles, wherein only one electric vehicle (EV) is connected to the charge station.

Referring now to FIG. 1, an electric power transmission system 10 having a charge station 12 for concurrently charging electric vehicles (EVs) is shown. EVs include hybrid electric vehicles having a traction battery, an electric motor, and an internal combustion engine and/or battery-only electric vehicles having just a traction battery and an electric motor and no engine. In addition to charge station 12, electric power transmission system 10 includes a high-voltage (HV) distribution network 14 and a local transformer 16. HV distribution network 14 supplies electrical power to local transformer 16. Local transformer 16 converts electrical power received from HV distribution network 14 into an AC mains electrical power having an AC mains voltage 18 (e.g., 85 Vac-265 Vac). AC mains voltage 18 has a sinusoidal waveform as shown in FIG. 1. Charge station 12 is connected to local transformer 16 such that the charge station functions as a source of the AC mains electrical power.

Charge station 12 has multiple electrical vehicle supply equipment (EVSE). In the example shown in FIG. 1, charge station 12 includes an EVSE1 20a, an EVSE2 20b, and an EVSE3 20c. EVSE1, EVSE2, and EVSE3 may be respectively plugged into first, second, and third EVs to concurrently connect charge station 12 to the first, second, and third EVs. Charge station 12, by being a multi-EVSE charge station, enables parking with multiple charging points for multiple EVs.

In the situation shown in FIG. 1, only one EV (namely, a first EV 22a) is connected to charge station 12. Charging points corresponding to EVSE2 and EVSE3 are not being used. In this case, EVSE1 is plugged into first EV 22a to connect charge station 12 to the first EV. As suggested from the closed switch of EVSE1, first EV 22a is receiving electrical power from charge station 12 via EVSE1. Consequently, the traction battery of first EV 22a is being charged with electrical power from charge station 12.

Particularly, for the traction battery of first EV 22a to be charged with electrical power from charge station 12, an on-board charger (OBC) of the first EV converts the electrical power from charge station 12 into a form suitable for charging the traction battery. The OBC outputs the converted electrical power for the traction battery to be charged with the converted electrical power. In this way, the OBC uses electrical power from charge station 12 to charge the traction battery.

EVs are becoming more popular every day and, in consequence, the number of charge stations where EVs can be recharged is growing as well. It is common for EV users to encounter multi-EVSE charge stations, such as charge station 12, or more commonly called "charging points", in supermarket parking areas, highway charging stations, etc. In such cases, a cost effective way to design the electrical infrastructure to supply multiple charging points is to use the same AC mains for all of them, being sure that the sum of all charging points rated power points does not surpass the AC mains rated power capabilities.

Figure 2:
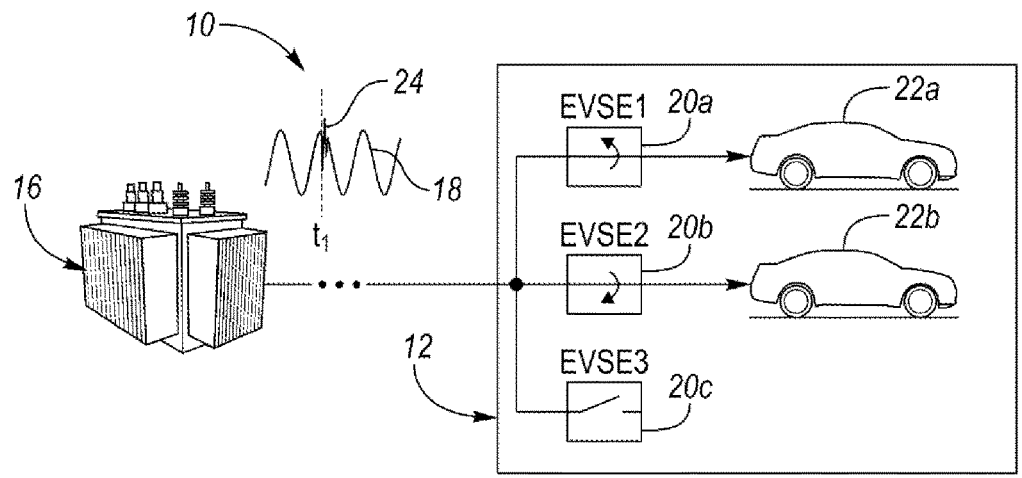
FIG. 2 illustrates a block diagram of a portion of the electric power transmission system, wherein multiple (e.g., two) EVs are concurrently are connected to the charge station.

Referring now to FIG. 2, a block diagram of a portion of electric power transmission system 10 in which multiple EVs are concurrently connected to charge station 12 is shown. These multiple EVs are first EV 22a and a second EV 22b. A problem is that upon an EV being connected to a charging point, AC mains voltage 18 gets highly distorted temporarily for some milli-seconds duration. For example, as shown in FIG. 2, upon an EV being connected to a charging point at time $t_1$, AC mains voltage 18 experiences voltage transients 24 commencing at the time $t_1$ and occurring thereafter for the milli-seconds duration. Voltage transients 24 of AC mains voltage 18 are caused by the OBC of the EV being connected to the charging point.

As such, when an EV gets connected to an AC mains which is already charging other EVs, the voltage transients of the AC mains voltage could stop the charging process of those other EVs already charging in parallel charging points if the OBCs of those other EVs are incapable of properly dealing with such voltage transients. Consequently, EV drivers could be heavily penalized by other EV drivers that use the same parking station.

For example, upon second EV 22b connecting to charge station 12 which is already charging first EV 22a via EVSE1, the OBC of the second EV causes voltage transients 24 of AC mains voltage 18 to be generated and, if the OBC of the first EV cannot handle the voltage transients properly, then EVSE1 may consider that the charging of the first EV is completed and thereby terminate the charging of the first EV. That is, depending on the reaction of the OBC of an EV being charged via an EVSE by charge station 12 to voltage transients 24 generated upon another EV being connected to the charge station, the EVSE of the EV which was being charged can consider the charging session to be finished and open its contactors permanently. (More particularly, the OBC considers the AC input faulty and stops charging to prevent system damage and then the OBC informs the EVSE that charging has stopped and the EVSE open the relays.) Hence, the traction battery of the EV which was being charged by charge station 12 may not get completely charged when it was supposed to.

This situation involving first EV 22a and second EV 22b is shown in FIG. 2. First EV 22a is being charged by charge station 12 via EVSE1 of the charge station. Subsequently, second EV 22b connects to charge station 12 of the charge station at time $t_1$. Second EV 22b connects to charge station 12 by the OBC of the second EV being connected with EVSE2 of the charge station. Second EV 22b connecting with charge station 12 is indicated in FIG. 2 by a switch of EVSE2 moving towards a closed position. Second EV 22b connecting with charge station 12 at time $t_1$ causes AC mains voltage 18 to have voltage transients 24 at the time $t_1$ and some milli-seconds duration thereafter. The OBC of first EV 22a encounters voltage transients 24 while the first EV is being charged by charge station 12. Assuming that the OBC of first EV 22a is not capable of properly dealing with voltage transients 24 and reacts accordingly, EVSE1 terminates the charging of the first EV by the charge station. EVSE1 terminating the charging of first EV 22a by charge station 12 is indicated in FIG. 2 by a switch of EVSE1 moving towards an opened position. Consequently, the charging of first EV 22a is stopped before the traction battery of the first EV has been fully charged.

Figure 3:
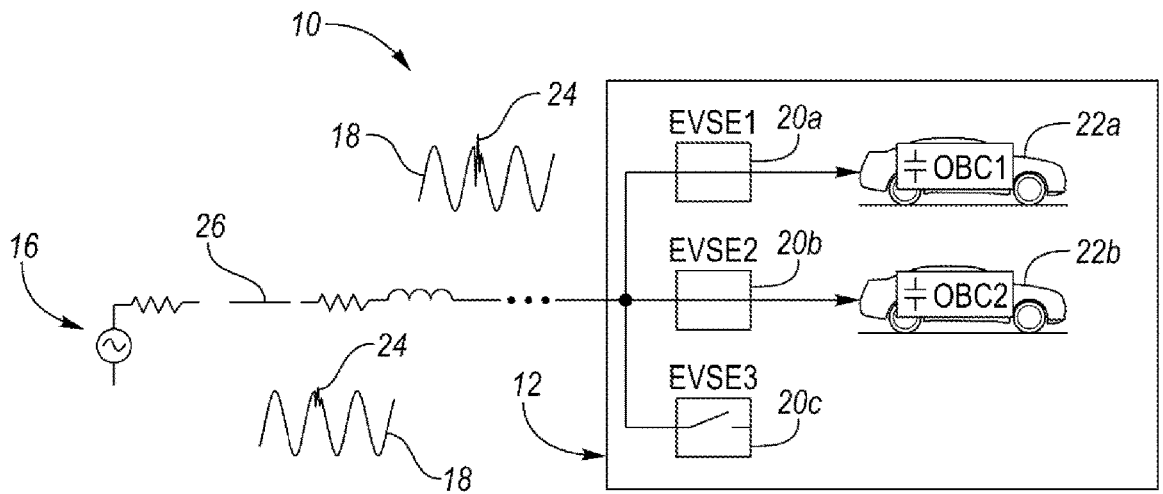
FIG. 3 illustrates another block diagram of the portion of the electric power transmission system shown in FIG. 2.

Referring now to FIG. 3, with continual reference to FIGS. 1 and 2, another block diagram of the portion of electric power transmission system 10 is shown. In the situation shown in FIG. 3, first EV 22a and second EV 22b are connected to charge station 12 via EVSE1 and EVSE2, respectively.

FIG. 3 is provided to describe a root cause of the problem of voltage transients 24 being generated. This root cause of the problem is mainly given by the EMI filter Cx capacitors of the OBCs of the EVs, an output impedance of local transformer 16, and an impedance of a cable 26 between local transformer 16 and the OBCs. It is common for local transformer 16 to be located a much further distance than the distance between the charging points. Parasitic inductance and resistance of cable 26 limits the local transformer capabilities to neutralize the voltage transients generated by OBC2 of the subsequently connected second EV 22b. This results in a limited capacity of local transformer 16 to absorb those transients provoked by EVs being connected to the AC mains. (The discharged capacitor of OBC2 provokes transients when OBC2 is connected to the AC mains through EVSE2.)

Figure 4:
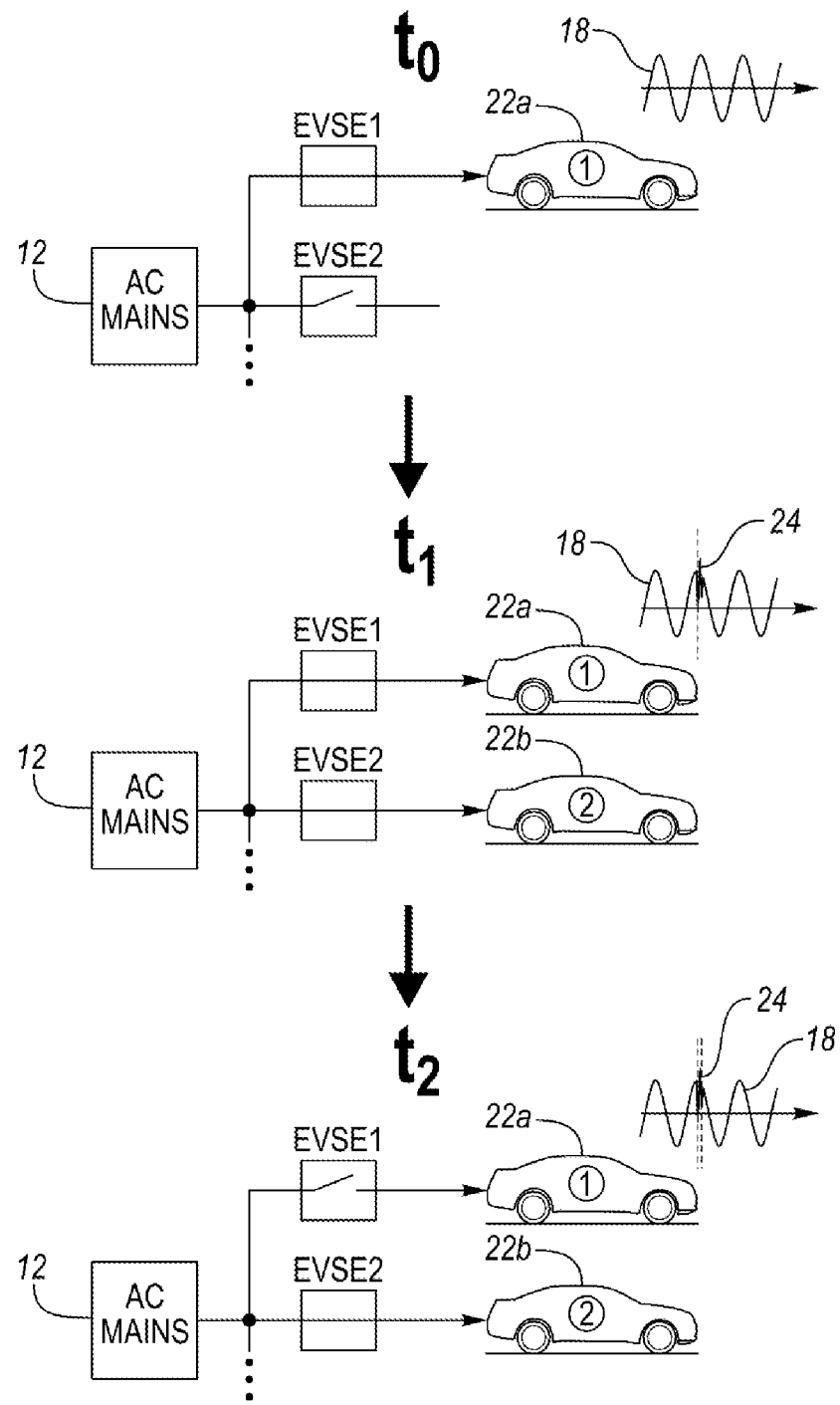
FIG. 4 illustrates a block diagram depicting an operation sequence involving a first EV and a second EV and the charge station.

Referring now to FIG. 4, a block diagram depicting a time sequence involving first EV 22a and second EV 22b and charge station 12 is shown. As shown in FIG. 4, at an initial time to, only first EV 22a is connected to charge station 12. First EV 22a is connected to charge station via EVSE1. During the time from time to $t_0$ a subsequent time $t_1$, mains voltage 18 from charge station 12 is clean. The OBC of first EV 22a receives mains voltage 18 for charging the traction battery of the first EV and, as the mains voltage is clean, the OBC of the first EV handles the charging process normally.

Subsequently, at the time $t_1$, while first EV 22a is connected to charge station 12, second EV 22b becomes connected to the charge station via EVSE2. Second EV 22b connecting to charge station 12 causes voltage transients 24 of mains voltage 18 to be generated. Voltage transients 24 commence at the time $t_1$ and occur for some milli-seconds duration thereafter. The OBC of first EV 22a encounters voltage transients 24 as the first EV was in the process of being charged by charge station 12.

At a subsequent time $t_2$ during which the OBC of first EV 22a reacts adversely in encountering voltage transients 24, EVSE1 terminates the charging of the first EV by charge station 12. Consequently, the charging of first EV 22a is stopped before the traction battery of the first EV has been fully charged. Second EV 22b remains being charged by charge station 12 as the OBC of the second EV does not encounter voltage transients 24 due to this OBC being in the process of being connected to the charge station as opposed to having been connected to the charge station like the OBC of first EV 22a.

In sum, due to the capacitive input of the EVs, when second EV 22b connects for charging in multiple-EVSE charge station 12, an undervoltage peak (i.e., voltage transients 24) is generated to the AC input (i.e., mains voltage 18) of the already connected first EV 22a (this corresponds to the time $t_1$ shown in FIG. 4). The already charging OBC (i.e., the OBC of first EV 22a) sees this undervoltage as an input fault and stops charging (this corresponds to the time $t_2$ shown in FIG. 4) until manual reset (vehicle safety function). Undesired vehicle charging stop due to another vehicle connection for charging should be avoided.

Figure 5:
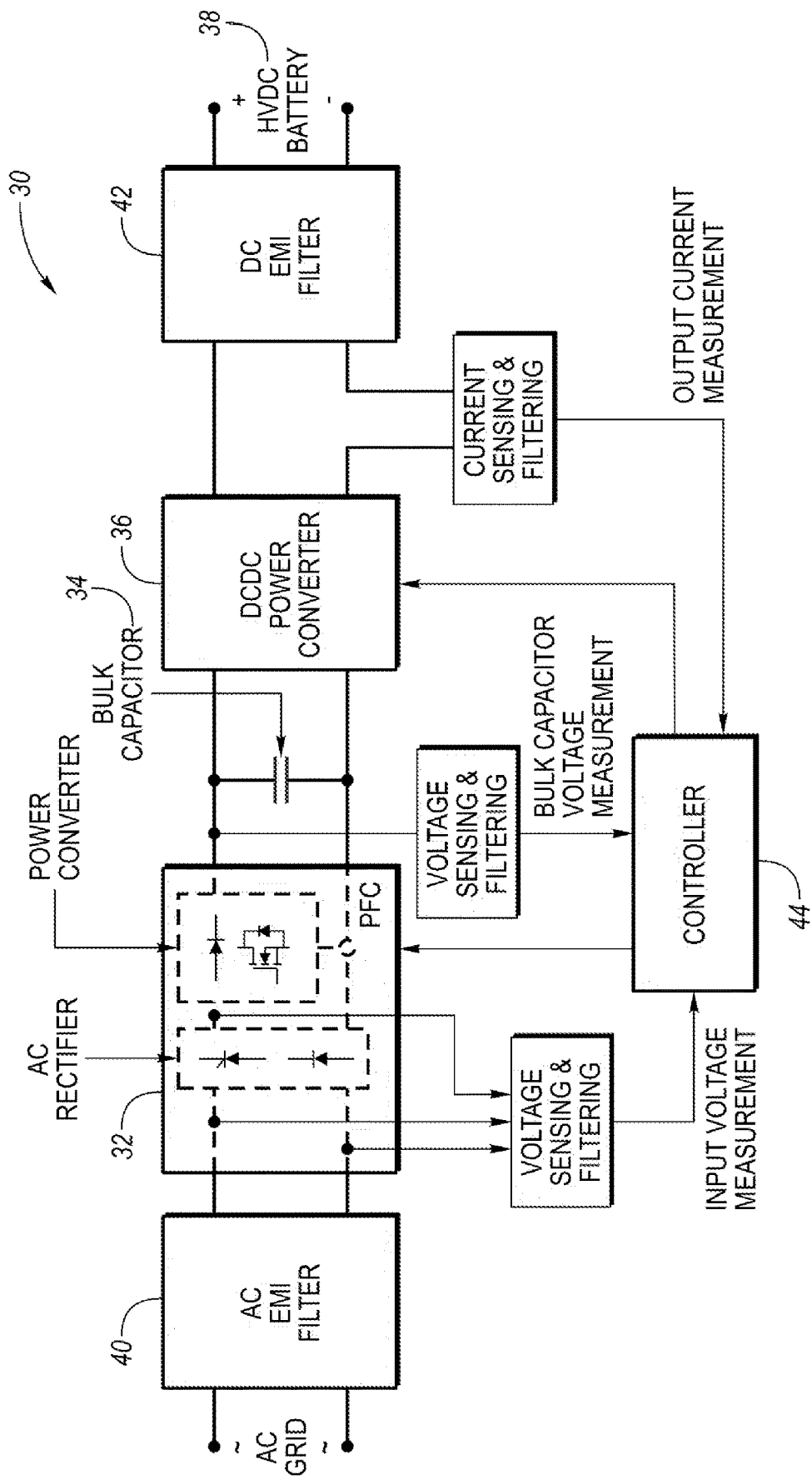
FIG. 5 illustrates a block diagram of an on-board charger (OBC) of an EV.

Referring now to FIG. 5, a block diagram of an OBC 30 of an EV is shown. OBC 30 includes a power factor corrector (PFC) 32, a DC link capacitor (or bulk capacitor) 34, and a DC/DC converter 36 ("DC" stands for direct current). OBC 30 is "on-board" an EV for charging a traction battery ("HV DC BATTERY") 38 of the EV.

OBC 30 is based on two cascaded power conversion stages (namely, a power factor correction stage to which PFC 32 belongs and a DC/DC conversion stage to which DC/DC converter 36 belongs) and their corresponding AC EMI filter 40 and DC EMI filter 42. AC EMI filter 40 is between the AC grid and the input end of PFC 32. DC EMI filter 42 is between the output end of DC/DC converter 36 and traction battery 38. DC link capacitor 34 is disposed between PFC 32 and DC/DC power converter 36.

In general, PFC 32 converts AC electrical power received from charge station 12 via an EVSE of the charge station into DC electrical power and delivers the DC electrical power to DC link capacitor 34 while keeping a power factor close to unity. PFC 32 is controlled so that the voltage of DC link capacitor 34 is regulated at a desired DC voltage level. The voltage of DC link capacitor 34 is the input voltage of DC/DC converter 36. DC/DC converter 36 converts the input voltage to a higher/lower DC voltage level according to the charge status of traction battery 38. This DC voltage level is the output voltage of DC/DC converter 36. Traction battery 38 is charged with DC output current from DC/DC converter 36 to the output voltage of the DC/DC converter.

The AC electrical power received by OBC 30 from charge station 12 may be a single, dual, or three-phase mains supply. As such, AC mains voltage 18 may be a single, dual, or three-phase AC mains voltage. For simplicity, charge station 12 is assumed to be a single-phase, mains supply. As such, OBC 30 is described herein as having a single set of PFC 32 and DC/DC converter 36. In the case of AC mains voltage 18 being a dual-phase (three-phase) AC mains voltage, OBC 30 would include two (three) sets of PFC 32 and DC/DC converter 36, respectively, for the two (three) phases.

OBC 30 further includes a controller 44. Controller 44 is an electronic device such as a processor, micro-controller, or the like (e.g., a computer). Controller 44 is in communication with PFC 32 and DC/DC converter 36 to control operations of the PFC and the DC/DC converter. For instance, controller 44 controls PFC 32 in converting AC electrical power from charge station 12 into DC electrical power and delivering the DC electrical power to DC link capacitor 34. In this regard, controller 44 appropriately controls the switching and switching duration of power transistor switches (schematically shown in FIG. 5) of PFC 32 to control the power factor correction provided by the PFC and the operation of the PFC in delivering a selected amount of DC electrical power, converted from the AC electrical power of charge station 12, to DC link capacitor 34. In this way, DC link capacitor 34 is regulated at the desired DC voltage level.

Controller 44 controls DC/DC converter 36 in converting the DC input voltage from DC link capacitor 34 to a higher (or lower) DC output voltage for charging traction battery 38. In this regard, controller 44 appropriately controls the switching and switching duration of power transistor switches (not shown) of DC/DC converter 36 for the DC/DC converter to convert the input voltage into a higher (or lower) output voltage. Controller 44 is also operable to communicate and control other nodes of the vehicle including nodes involved in the charging applications.

In general, controller 44 manages both power conversion stages of OBC 30 with at least measurements of the AC input voltage of PFC 32, the AC input current of PFC 32, the DC voltage of DC link capacitor 34, and/or the output current DC/DC converter 36. The AC input voltage can be measured, on one hand, in differential mode prior to an AC rectifier of PFC 32 or in bridgeless PFC topologies or, on the other hand, after the AC rectifier.

Figure 6:
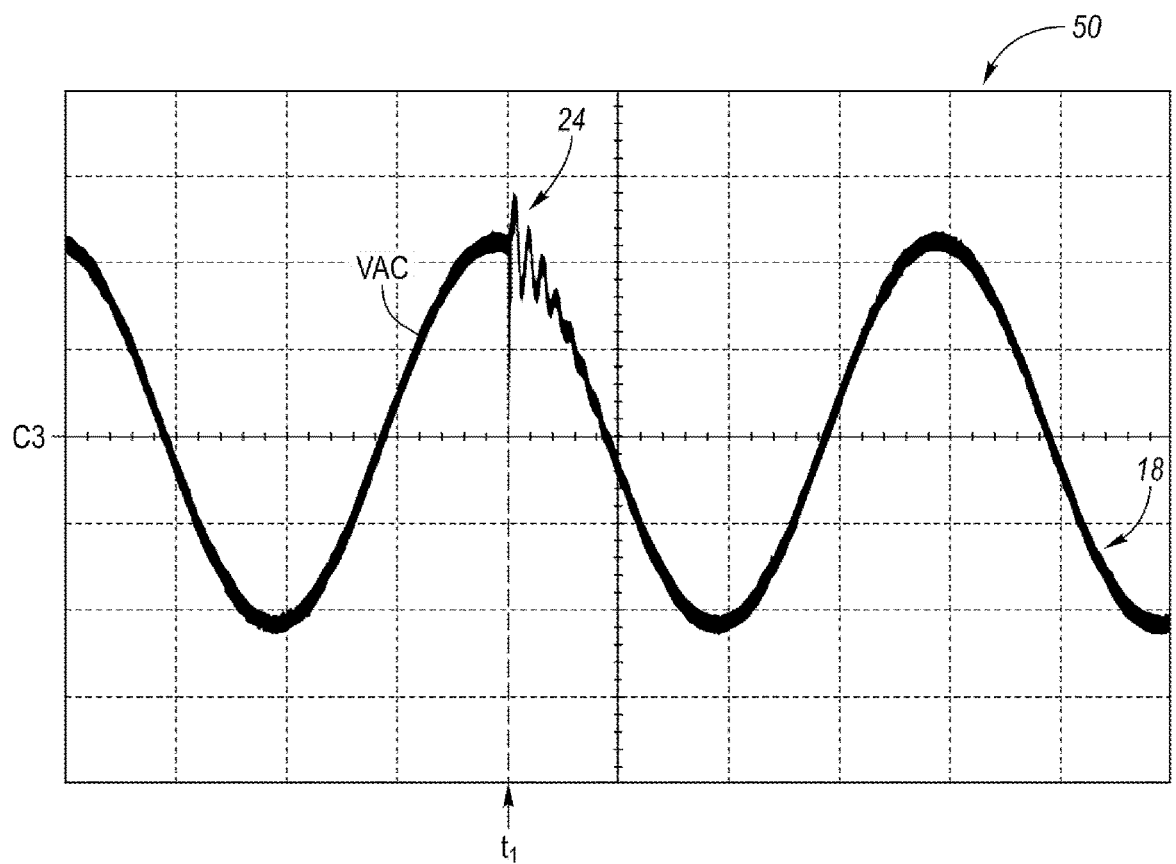
FIG. 6 illustrates a graph having a plot of the AC mains voltage from the charge station with voltage transients commencing at a time $t_1$ and occurring thereafter for some milli-seconds duration, the voltage transients being generated upon an EV being connected to the charge station.

Referring now to FIG. 6, a graph 50 having a plot of AC mains voltage 18 from charge station 12 with voltage transients 24 commencing at a time $t_1$ and occurring thereafter for some milli-seconds duration is shown. As described herein, voltage transients 24 are generated upon an EV being connected to charge station 12 and the OBC of an EV concurrently being charged by the charge station may respond to the voltage transients in such a manner that the charging of this EV is prematurely terminated. As such, the plot of AC mains voltage 18 of graph 50 captures the voltage disturbance of voltage transients 24 when an EVSE connects an EV to the AC mains of charge station 12.

Figure 7A:
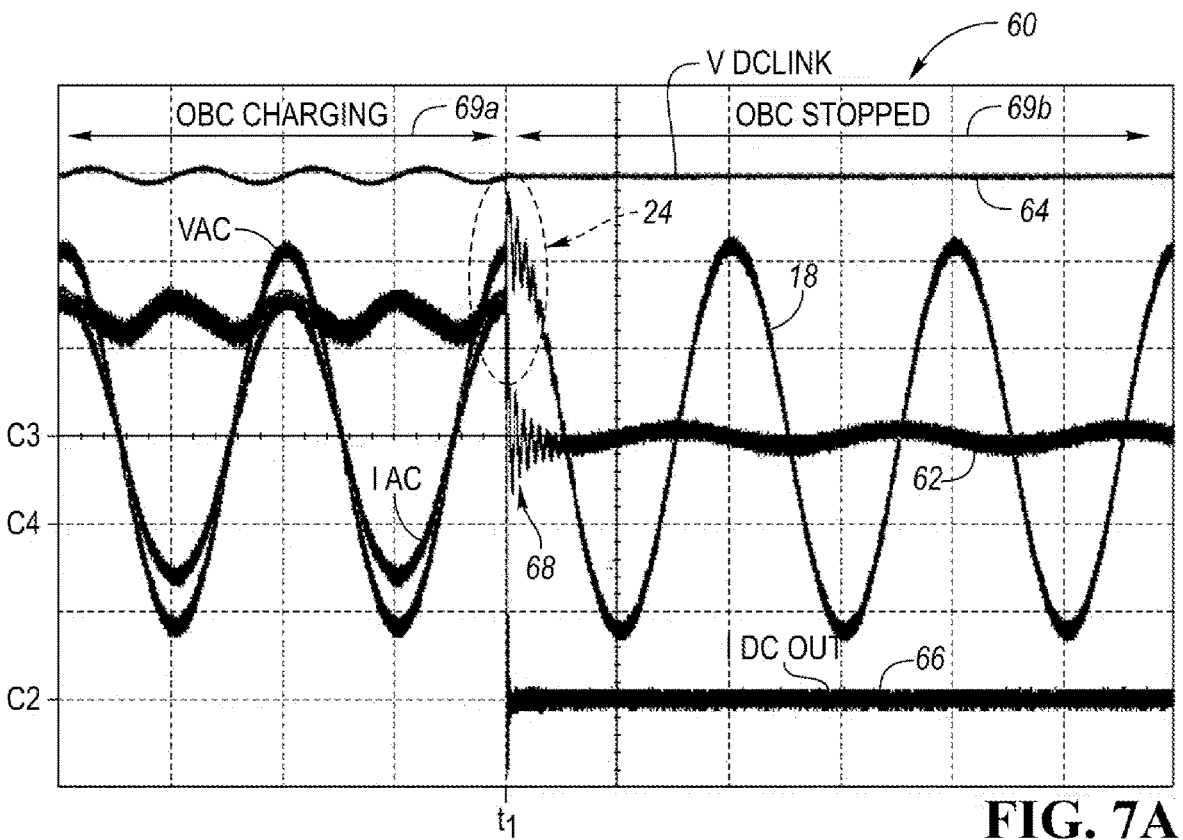
FIG. 7A illustrates a graph having plots of the AC mains voltage, an AC input current, a bulk capacitor voltage, and a DC output current delivered from the OBC of an EV to the traction battery of the EV during the operation of the OBC in the case of the OBC being a typical OBC that is not designed to handle the voltage transients in the AC mains voltage in an opportune manner.

Referring now to FIG. 7A, in the case of OBC 30 of an EV being a typical OBC that is not designed to function properly in encountering voltage transients 24 in AC mains voltage 18, a graph 60 having plots of AC mains voltage 18 (i.e., the AC input voltage), an AC input current 62, a bulk capacitor voltage 64, and a DC output current 66 delivered from the typical OBC to the traction battery of the EV is shown. Notably, AC input current 62 has current transients 68 commensurate with voltage transients 24.

Graph 60 is indicative of the operation of a typical OBC that is not designed to handle voltage transients 24 in AC mains voltage 18 in an opportune manner. That is, the behavior of such a typical OBC is depicted in graph 60 when the typical OBC is charging with AC mains voltage 18 and another OBC of another EV connects to AC mains voltage 18 via another EVSE of the charge station. When a deep voltage transient at the AC input voltage occurs (at time $t_1$ shown in graph 60), the typical OBC stops to charge because controller 44 is not able to keep the AC input current waveform under control and generates an overcurrent situation that creates an emergency stop. Therefore, the charge of the traction battery of the EV is incomplete. Consequently, the typical OBC is charging prior to the time $t_1$, as indicated by operation line 69a, and the typical OBC stops charging after the time $t_1$, as indicated by operation line 69b. (Normally "the controller" affects the internal components so that the input current is drained according the processing expected. A voltage instability would generate a control instability that could lead to an overcurrent and internal damages and so, before that, the controller stops the generation. As it is said, it seems that the controller decides to generate an overcurrent so that there are other elements that trigger an emergency stop. "The controller" refers to the complete controlling system, including the safety stopping when the parameters for the basic operation algorithm are out of range (like in an instability).)

Figure 7B:
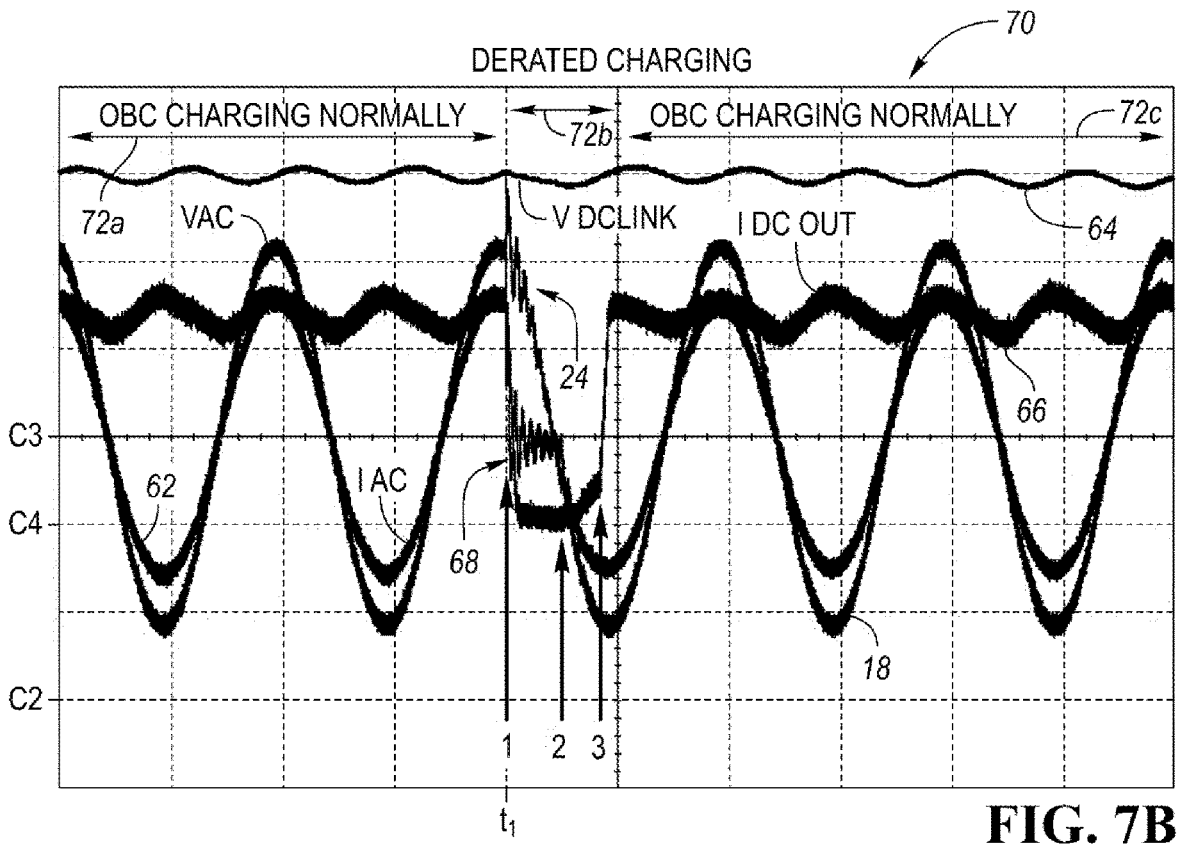
FIG. 7B illustrates a graph like the graph shown in FIG. 7A in the case of the OBC being designed in accordance with embodiments of the present invention to handle the voltage transients in the AC mains voltage in an opportune manner.

Referring now to FIG. 7B, in the case of OBC 30 of an EV being designed in accordance with embodiments of the present invention to thereby function properly in encountering voltage transients 24 in AC mains voltage 18, a graph 70 having plots of AC mains voltage 18, AC input current 62 with current transients 68, bulk capacitor voltage 64, and DC output current 66 delivered from the OBC to the traction battery of the EV is shown.

Graph 70 is indicative of the operation of OBC 30 when the OBC is designed, in accordance with embodiments of the present invention, to handle voltage transients 24 in AC mains voltage 18 in an opportune manner. That is, the behavior of OBC 30 designed in accordance with embodiments of the present invention to thereby handle voltage transients 24 in AC mains voltage 18 in an opportune manner is depicted in graph 70 when the OBC is charging with AC mains voltage 18 and another OBC of another EV connects to AC mains voltage 18 via another EVSE of the charge station.

In accordance with embodiments of the present invention, OBC 30 generally performs the following operations when a deep voltage transient occurs at the AC input whereby the OBC is designed to handle voltage transients 24 in AC mains voltage 18 in an opportune manner. The operations include: (1) stopping the operation of PFC 32 and reducing DC output current 66 from DC/DC converter 36 to, for example, 50% of its setpoint, indicated by the reference "1" in graph 70; (2) waiting for voltage transients 24 to pass and then resuming the operation of PFC 32 at the next zero-crossing event of AC mains voltage 18 and at the same power conditions than before the stoppage of the PFC, indicated by the reference "2" in graph 70; and (3) the setpoint of DC output current 66 recovers to the original value when bulk voltage 64 comes back close to its bulk voltage setpoint, indicated by the reference "3" in graph 70.

The operations (1) and (2) are performed by controller 44. The operation (3) of the decision to return to the given setpoint, after sensing the DC-Link is at the right charge level, is also performed by controller 44.

Put another way, when an undervoltage transient occurs at AC mains voltage 18, OBC 30 opens input stages (particularly, the OBC controller stops driving actively the switching elements (e.g., MOSFETs) of the PFC which thereby causes the electrical power conversion processing of the PFC to stop) and reduces DC output current 66 to, for example, 50% of its setpoint, indicated by reference numeral "1" in graph 70. After voltage transients 24 pass, OBC 30 resumes the operation at the next zero-crossing of AC mains voltage 18, indicated by reference numeral "2" in graph 70. Energy for generating DC output voltage 66 is supplied by discharging DC link capacitor 34 during the period between reference numerals "1" and "2". DC output current 66 setpoint recovers when DC link voltage 64 returns to its setpoint, indicated by reference numeral "3" in graph 70. Storage energy of DC link capacitor 34 is replenished during the period between reference numerals "2" and "3" prior to resuming normal operation of OBC 30. (Energy is taken from DC link capacitor 30 until the normal operation of OBC 30 resumes.)

Accordingly, when a deep voltage transient at the AC input voltage occurs (at time $t_1$ shown in graph 70), OBC 30 designed in accordance with embodiments of the present invention does not stop charging as the charging is instead simply de-rated (i.e., stop operation of PFC 32 and reduce DC output current 66 to 50% of its setpoint) until voltage transients 24 have passed at which time charging is fully resumed. Therefore, the charging from charge station 12 is not interrupted and the charging of the traction battery will be fully completed. Consequently, OBC 30 designed in accordance with embodiments of the present invention charges normally prior to the time $t_1$, as indicated by operation line 72a, and then charges de-ratably at the time time $t_1$ until voltage transients 24 have passed, as indicated by operation line 72b, and then resumes charging normally upon the next zero-crossing event after the voltage transients have passed, as indicated by operation line 72c.

Figure 8:
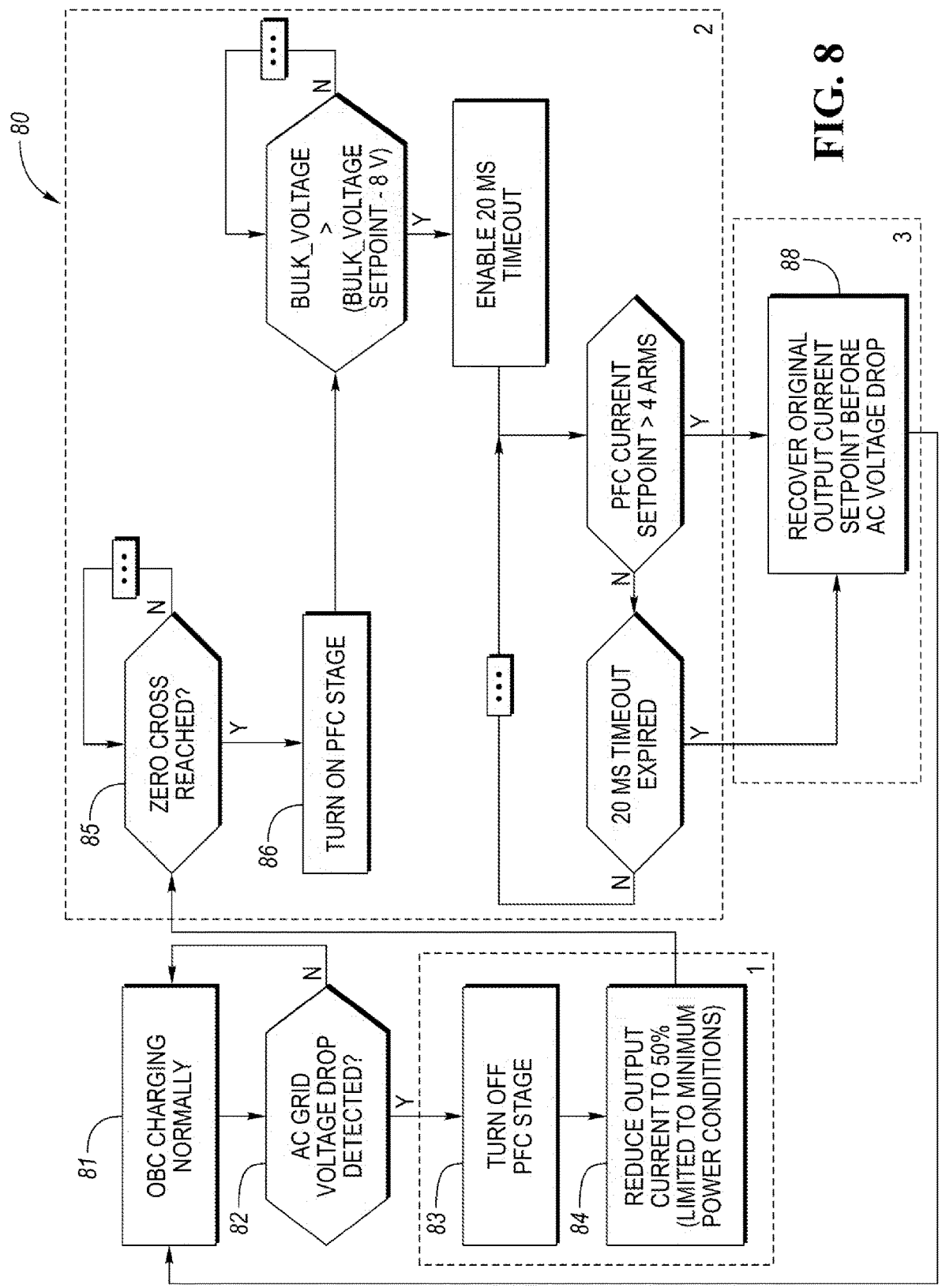
FIG. 8 illustrates a flowchart depicting operation of a method and system for controlling the OBC to accommodate voltage transients in the AC mains voltage caused by multi-vehicle charging in accordance with embodiments of the present invention.

Referring now to FIG. 8, with continual reference to FIG. 7B, a flowchart 80 depicting operation of a method and system for controlling OBC 30 to accommodate voltage transients 24 in AC mains voltage 18 caused by multi-vehicle charging in accordance with embodiments of the present invention is shown. The operation depicted in flowchart corresponds to the operation described above regarding reference numerals "1", "2", and "3" of graph 70 in FIG. 7B. Controller 44 performs the decisions and the actions of the operation.

The operation begins with OBC 30 charging normally as indicated in block 81. Upon a voltage drop of the AC grid being detected (i.e., upon voltage transients in the supply voltage being detected) in decision block 82, the PFC stage of OBC 30 is turned off as indicated in block 83 and the output current of the OBC is reduced as indicated in block 84. After the voltage transients have passed, the operation continues with detecting for the next zero-cross event in decision block 85. Upon the next zero-cross event occurring, the PFC stage of OBC 30 is turned back on as indicated in block 86. This causes the storage energy of the DC link capacitor to be replenished. Once the DC link capacitor is adequately replenished in decision block 87, the output current of OBC 30 may be increased to its original setpoint as indicated in block 88.

Figure 9:
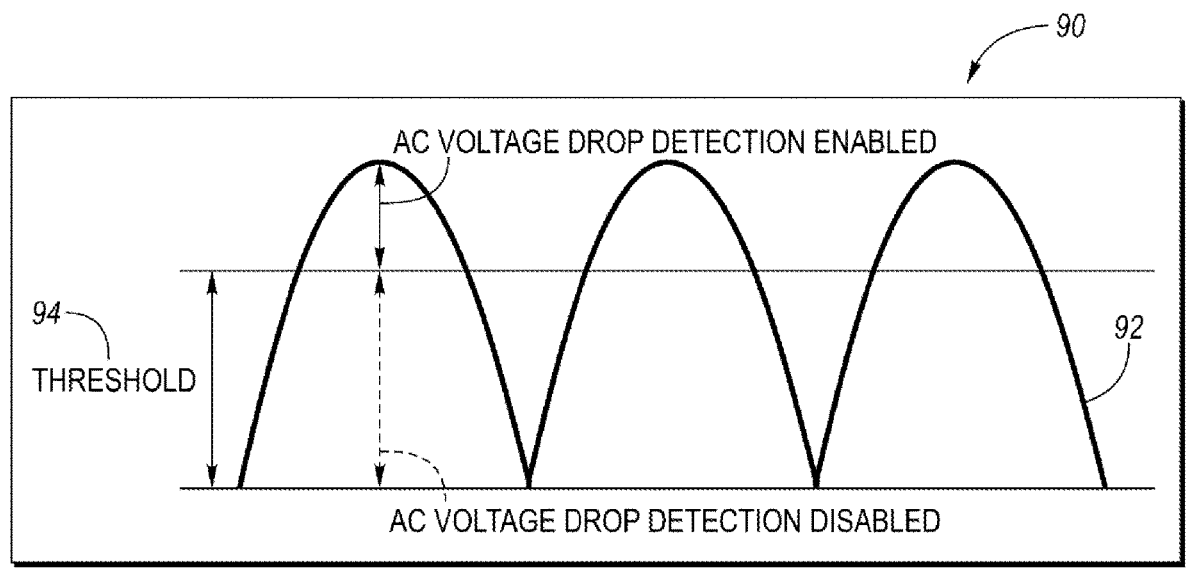
FIG. 9 illustrates a graph having a plot of a rectified AC input voltage, which is outputted from an AC rectifier of a PFC of the OBC.

Referring now to FIG. 9, a graph 90 having a plot of a rectified AC input voltage 92, which is outputted from an AC rectifier of PFC 32, is shown. Graph 90 is provided to explain the AC voltage drop detection. It has been seen that the issue is really a problem for AC input voltage conditions close to the peak voltage. Accordingly, in accordance with embodiments of the present invention, the AC voltage drop detection mechanism of controller 44 is enabled only when rectified AC input voltage 92 is above a certain threshold 94. Threshold 94 is different depending on the grid voltage conditions. For instance, if the nominal grid voltage is greater than 175 Vac (230/240 Vac typical user case), then threshold 94 is 200 V; and if the nominal grid voltage is less than 175 Vac (110/120 Vac typical user case), then threshold 94 is 100 V.

Figure 10:
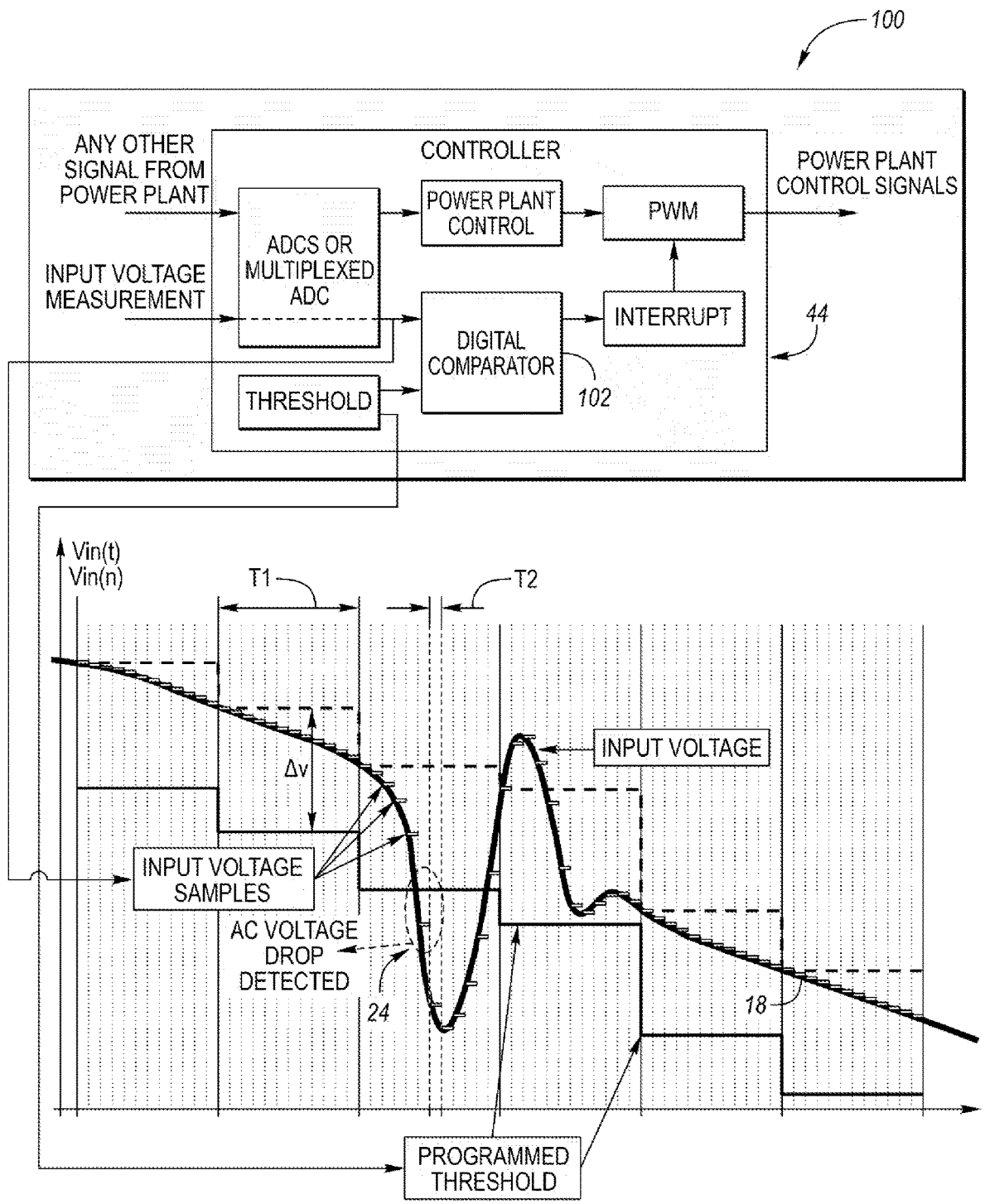
FIG. 10 illustrates a block diagram of a controller of the OBC and a graph of a plot of a portion of the AC mains voltage with voltage transients, the block diagram of the controller and the graph of the plot of the portion of the AC mains voltage being marked in conjunction with one another to illustrate operation of the controller in detecting AC voltage drop due to voltage transients in accordance with embodiments of the present invention.

Referring now to FIG. 10, a block diagram of controller 44 of OBC 30 and a graph 100 of a plot of a portion of AC mains voltage 18 with voltage transients 24 is shown. The block diagram of controller 44 and graph 100 of the plot of the portion of AC mains voltage 18 being marked in conjunction with one another to illustrate operation of the controller in detecting AC voltage drop due to voltage transients in accordance with embodiments of the present invention.

In operation, controller 44 samples AC mains voltage 18 with a periodicity of T2 (8 μS in this application). The threshold is calculated with a periodicity of T1 (100 μS in this application) using the latest input voltage sample minus a certain delta voltage Δv. The delta voltage Δv is different depending on the nominal grid voltage. For instance, if the nominal grid voltage is greater than 175 Vac, then the delta voltage Δv is 40V; and if the nominal grid voltage is less than 175 Vac, then the delta voltage Δv is 20V.

A digital comparator 102 of controller 44 is programmed using the previously calculated threshold to generate an interrupt if any sample of the input voltage is below the calculated threshold. If an interrupt is generated from digital comparator 102, then PWM (pulse width modulated) signals of PFC 32 are disabled.

In conclusion, as described herein, parallel vehicle connection environments are common and AC mains voltage is generally distorted when an EV is connected to the AC mains. OBCs should be robust against AC grid disturbances including those coming from other EVs connected to the same grid. On the contrary, the charging process could be aborted, and the traction battery will not be completely recharged as the EV user expects. An OBC in accordance with embodiments of the present invention is digitally controlled by a controller of the OBC in a relatively simple way as described herein to be made robust against AC grid disturbances generated by EVs being connected to the grid and thereby avoid the charging process from being interrupted. In this regard, the controller can be programmed with software for controlling the OBC in the relatively simple way as described herein. The implementation of controlling the OBC in the relatively simple way as described herein may avoid the use of analog PFC controllers to face the voltage disturbances which is cost effective for multi-phase (e.g., three-phase) OBC implementations. (The noted PFC controllers are in the context of analog isolated voltage sensors that would provide directly the voltage values to the main controller that would make the decision directly, without waiting for indications from the existing elements in the control loops. That might be faster but, no doubt, more expensive and requiring more space in the electronic circuits.)

As further described herein, benefits of an OBC in accordance with embodiments of the present invention include resilience in front of deep voltage drops from the AC mains input, which occur whenever another EV connects to the AC mains input. The software algorithm implemented by the controller of the OBC is based in signals already being measured by the controller. As such, the OBC has no extra hardware than it would otherwise have. Using analog controllers in the PFC stage to handle deep voltage drops from the AC mains input would be more costly.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for charging a traction battery of an electric vehicle, comprising:
an on-board battery charger (OBC) configured to receive AC electrical power from a charge station and to output a DC output current, from a DC/DC converter of the OBC, for charging the traction battery; and
a controller configured to, in response to transients in the AC electrical power while the OBC is receiving the AC electrical power from the charge station and outputting the DC output current at a DC current setpoint, control the OBC to (i) stop processing the AC electrical power from the charge station and reduce the DC output current and (ii) after the transients have passed, resume processing the AC electrical power from the charge station at a zero-crossing event of the AC electrical power and increase the DC output current output from the DC/DC converter to the traction battery at the zero-crossing event, wherein the DC output current is set back to the DC current setpoint.

2. The system of claim 1, wherein:
the zero-crossing event of the AC electrical power is the zero-crossing event of the AC electrical power occurring immediately after the controller has detected that the transients have passed.

3. The system of claim 1, wherein:
the transients in the AC electrical power occur upon another electric vehicle receiving AC electrical power from the charge station while the OBC is receiving the AC electrical power from the charge station.

4. The system of claim 1, wherein the controller is configured to reduce the DC output current to 50% of the DC current setpoint.

5. The system of claim 1, wherein:
the AC electrical power includes an AC mains voltage and the transients in the AC electrical power are voltage transients in the AC mains voltage.

6. The system of claim 5, wherein:
the zero-crossing event of the AC electrical power after the transients have passed is a zero-crossing event of the AC mains voltage after the voltage transients in the AC mains voltage have passed.

7. The system of claim 1, wherein:
the OBC includes a power factor corrector (PFC) and the DC/DC converter, and the PFC is to receive the AC electrical power from the charge station for the OBC to be configured to receive the AC electrical power from the charge station.

8. The system of claim 7, wherein:
the OBC further includes a DC link capacitor disposed between the PFC and the DC/DC converter; and
the controller is further configured to control the OBC to have the DC link capacitor discharge to supply DC electrical power for the DC/DC converter to output the reduced DC output current while the OBC is controlled to stop the PFC from processing the AC electrical power from the charge station.

9. The system of claim 8, wherein:
the controller is further configured to control the OBC to have the DC link capacitor be recharged as the OBC is controlled to resume processing the AC electrical power from the charge station.

10. A method for charging a traction battery of an electric vehicle, comprising:
receiving, by an on-board battery charger (OBC) of the electric vehicle, AC electrical power from a charge station and outputting, by a DC/DC converter of the OBC, a DC output current for charging the traction battery;
detecting transients in the AC electrical power while the OBC is receiving the AC electrical power from the charge station and outputting the DC output current at a DC current setpoint;
controlling the OBC, while the transients are present, to stop processing the AC electrical power from the charge station and to reduce the DC output current; and
controlling the OBC, at a zero-crossing event of the AC electrical power after the transients have passed, to resume processing the AC electrical power from the charge station at the zero-crossing event and to increase the DC output current output from the DC/DC converter to the traction battery at the zero-crossing event, wherein the DC output current is set back to the DC current setpoint.

11. The method of claim 10, wherein:
the zero-crossing event of the AC electrical power is the zero-crossing event of the AC electrical power occurring immediately after the transients have passed.

12. The method of claim 10, wherein the transients in the AC electrical power occur upon another electric vehicle receiving AC electrical power from the charge station while the OBC is receiving the AC electrical power from the charge station.

13. The method of claim 10, wherein the AC electrical power includes an AC mains voltage and the transients in the AC electrical power are voltage transients in the AC mains voltage.

14. The method of claim 13, wherein the zero-crossing event of the AC electrical power after the transients have passed is a zero-crossing event of the AC mains voltage after the voltage transients in the AC mains voltage have passed.

15. The method of claim 10, wherein the OBC includes a power factor corrector (PFC) and the DC/DC converter, wherein:
receiving, by the OBC, the AC electrical power from the charge station includes the PFC receiving the AC electrical power from the charge station.

16. The method of claim 15, wherein the OBC further includes a DC link capacitor disposed between the PFC and the DC/DC converter, wherein:

controlling the OBC, while the transients are present, to stop processing the AC electrical power from the charge station and to reduce the DC output current includes controlling the OBC to have the DC link capacitor discharge to supply DC electrical power for the DC/DC converter to output the reduced DC output current.

17. The method of claim 16, wherein:
controlling the OBC, at the zero-crossing event of the AC electrical power after the transients have passed, to resume processing the AC electrical power from the charge station at the zero-crossing event and to increase the DC output current at the zero-crossing event includes controlling the OBC to have the DC link capacitor be recharged.

18. A system for charging a traction battery of an electric vehicle, comprising:
an on-board charger (OBC) having a power factor corrector (PFC), a DC/DC converter, and a DC link capacitor disposed between the PFC and the DC/DC converter, wherein the PFC is to receive an AC mains voltage from a charge station, the DC link capacitor is to be charged by the PFC to a DC voltage setpoint, and the DC/DC converter is to receive DC electrical power from the DC link capacitor to output a DC output current at a DC current setpoint for charging the traction battery;
a controller configured to detect voltage transients in the AC mains voltage while the PFC is receiving the AC mains voltage, the DC link capacitor is charged to the DC voltage setpoint, and the DC/DC converter is outputting the DC output current at the DC current setpoint; and
the controller further configured to control the OBC, in response to detecting voltage transients in the AC mains voltage, to stop operation of the PFC and reduce the DC output current whereby the DC link capacitor discharges from the DC voltage setpoint and then to resume operation of the PFC at a zero-crossing event of the AC mains voltage after the voltage transients have passed to thereby recharge the DC link capacitor back to the DC voltage setpoint and to increase the DC output current at the zero-crossing event, wherein the DC output current is set back to the DC current setpoint.

19. The system of claim 18, wherein:
the zero-crossing event of the AC mains voltage is the zero-crossing event of the AC mains voltage occurring immediately after the voltage transients have passed.

20. The system of claim 18, wherein:
the voltage transients in the AC mains voltage occur upon another electric vehicle receiving the AC mains voltage from the charge station while the OBC is receiving the AC mains voltage from the charge station.

* * * * *